United States Patent [19]

van Ligten et al.

[11] Patent Number: 5,286,419
[45] Date of Patent: Feb. 15, 1994

[54] PROCESS FOR MAKING A LIGHT POLARIZING SPECTACLE LENS

[75] Inventors: Raoul F. van Ligten, Coral Springs; Mark G. Asmus, Lauderhill, both of Fla.

[73] Assignee: BMC Industries, Inc., Minneapolis, Minn.

[21] Appl. No.: 839,146

[22] Filed: Feb. 20, 1992

[51] Int. Cl.$^5$ .............................................. B29D 11/00
[52] U.S. Cl. .................................... 264/1.3; 264/1.7; 264/2.6; 264/2.7; 264/2.2
[58] Field of Search .................. 264/1.3, 1.7, 2.2, 2.6, 264/2.7

[56] References Cited

U.S. PATENT DOCUMENTS

| | | | |
|---|---|---|---|
| 2,041,138 | 5/1936 | Land | 264/1.3 |
| 2,165,973 | 7/1939 | Land | 264/1.3 |
| 2,263,249 | 11/1941 | Rogers . | |
| 2,320,375 | 6/1943 | Moulton . | |
| 2,387,308 | 10/1945 | Styll | 264/1.3 |
| 3,171,869 | 3/1965 | Weinberg | 264/1.4 |
| 3,208,902 | 9/1965 | Arond et al. . | |
| 3,211,811 | 10/1965 | Lanman | 264/2.3 |
| 3,560,076 | 2/1971 | Ceppi | 350/155 |
| 3,620,888 | 11/1971 | Buzzell . | |
| 3,673,055 | 6/1972 | Sheld . | |
| 3,674,587 | 7/1972 | Laliberte | 156/245 |
| 3,711,417 | 1/1973 | Schuler | 252/300 |
| 3,786,119 | 1/1974 | Ortlieb | 264/2.3 |
| 3,833,289 | 9/1974 | Schuler | 350/155 |
| 3,940,304 | 2/1976 | Schuler | 156/245 |
| 4,873,029 | 10/1989 | Blum | 264/1.3 |

FOREIGN PATENT DOCUMENTS 1435329 5/1976 United Kingdom ................ 264/1.3

*Primary Examiner*—James Lowe
*Attorney, Agent, or Firm*—Kinney & Lange

[57] ABSTRACT

A process for making a light polarizing spectacle lens and the light polarizing spectacle lens product. The process includes drying a polarizing film at approximately 140–160° F. for approximately 2–2 hours in order to drive out any transport media from the polarizing film. The process next includes forming the dried polarizing film into a wafer, curving the wafer at a specific time and temperature range, notching the curved wafer to align with a pair of gasket protrusions, and positioning the wafer within a lens mold. The process additionally includes adding a lens resin to the lens mold containing the wafer so that the lens resin includes a pregelled monomer in a weight percent of 65–75% and curing the lens.

3 Claims, 3 Drawing Sheets

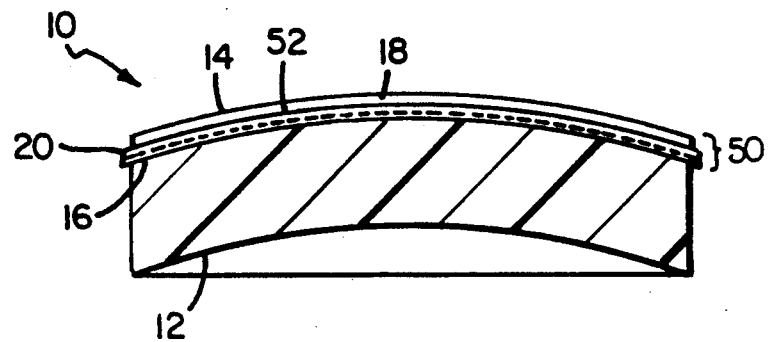
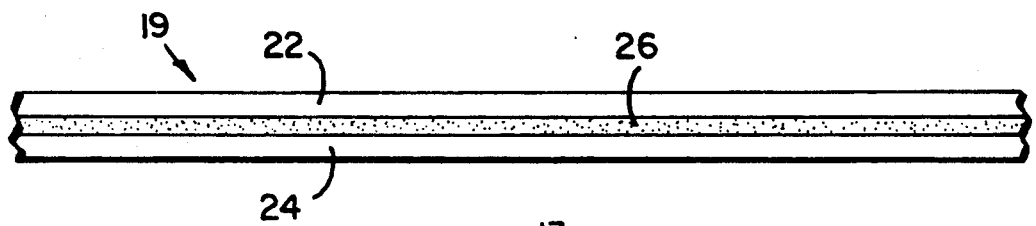
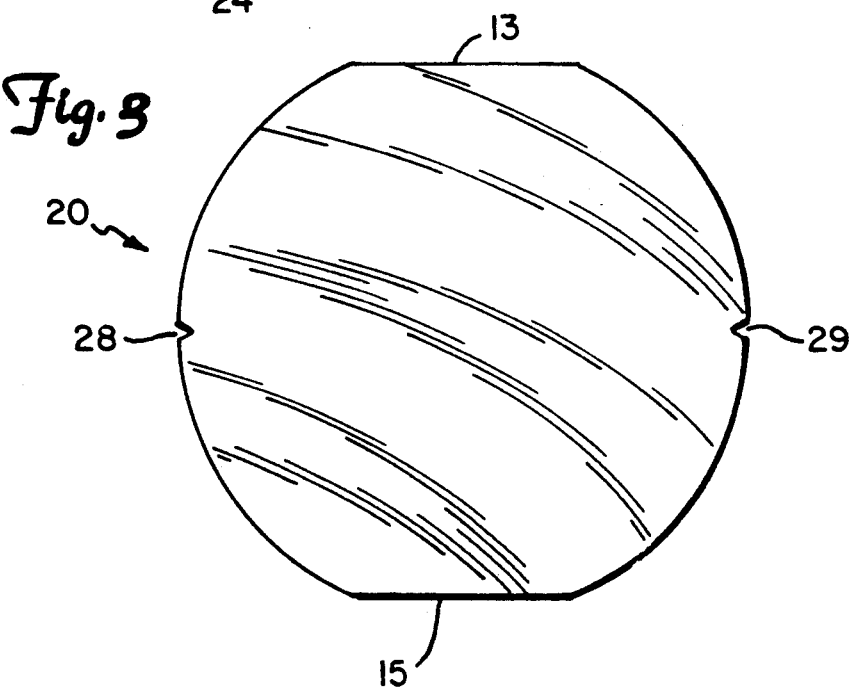

PROCESS FOR MAKING A LIGHT POLARIZING SPECTACLE LENS

BACKGROUND OF THE INVENTION

The present invention relates to a light polarizing spectacle lens and to a process for making the light polarizing spectacle lens.

The successful manufacture of a high quality light polarizing spectacle lens is hampered by several problems that have resisted solution. The problems are associated with an outer lens resin and an inner polarizing film combining with the outer lens resin to make the light polarizing lens product.

One problem encountered in manufacturing a light polarizing lens is the problem of undesired cylindrical power in a finished lens. The problem of undesired cylindrical power arises when front curvatures of a semi-finished lens vary excessively when measured in a horizontal and a vertical meridian. For some lenses, curvatures vary by more than 0.12 diopters. The Laliberte Pat. No. 3,674,587, issued on Jul. 4, 1972, describes a method for positioning a sheet of polarizing film in a cast polymer in an attempt to reduce though not eliminate an undesired cylindrical power. The Laliberte patent describes the polarizing film as being in close proximity to the front of one cast optical element, but remaining completely embedded within a casting.

Another related problem of manufacturing polarizing lenses concerns making a thick rather than a thin lens. Light polarizing lenses typically have an undesirable thickness within both the center of the lens and at the edge of the lens.

A third problem encountered in making a polarizing spectacle lens is the problem of delamination. Delamination describes a separation of the layers of different materials used to make a polarizing spectacle lens. Light polarizing lenses have a particular problem of delaminating when dipped in a dye bath having a temperature near the boiling point of water for longer than fifteen minutes. The Arond et al. Pat. No. 3,208,902, issued on Sep. 28, 1965, describes the use of an adhesive to bond the layers of a polarizing lamination in order to reduce the delamination problem for lenses exposed to water immersion and dry heat.

The Ortlieb Pat. No. 3,786,119, issued on Jan. 15, 1974, describes a method of cutting the polarizing film into screens of appropriate form with suitable axial direction, curving the screens and covering the curved screens with an attachment varnish. The screens are then placed in molds. The molds are filled with a polymerizable or poly-condensible liquid resin.

A fourth problem encountered in the manufacture of light polarizing lenses includes the migration of lens polymer constituents such as plastisizers and catalysts into the light polarizing film. The migrating constituents can damage the polarizing film by causing the film to deform on a micro scale. The migrating material can also bleach dyes in the light polarizing film and film carrier. As a consequence, the color consistency from lens-to-lens is poor. The color inconsistency promotes waste by preventing the mounting of two lenses in the same spectacle frame. The Schuler patent, U.S. Pat. No. 3,940,304, issued Feb. 24, 1976, describes a step of coating the light polarizing film with a tiecoat-barrier to stop undesirable migration. The Schuler patent, U.S. Pat. No. 3,833,289, issued Sep. 3, 1974, describes the use of cross-linked nitrocellulose and one other polymer to act as a barrier between the light polarizing film and lens polymer. Attempts to reduce migration have resulted in weak adhesion between a lens body and a film carrier.

A fifth problem in the manufacture of polarizing spectacle lenses is a hazing of the light polarizing lens. Hazing is a defect introduced by the propagation of micro-cracks during manufacture of the lens. The hazing problem occurs when the polarizing film is combined with an outer lens polymer, typically in a lens mold. One cause of hazing includes an uneven polymerization of the outer lens polymer. The Weinberg U.S. Pat. No. 3,171,869, issued on Mar. 2, 1965, describes a process for casting the outside lens polymer at a temperature within an approximate range of 257° F. and 455° F. in order to control uneven polymerization and to reduce hazing. Specifically, with the Weinberg process, the lens is temporarily softened by heat so that the polymer chains have sufficient mobility to be bonded together in cross-links. Upon cooling the lens, the softness disappears due to the restoration of attractive forces, partially responsible for the hardness which is displayed by the lens at room temperature.

Hazing has also been initiated by accidental concentration of the lens polymer in a particular region of the lens. The accidental concentration creates a stress center from which fracture may begin. The Weinberg patent describes the use of a polymerization catalyst to reduce the accidental concentration hazard.

A second cause of hazing results from the attractive forces responsible for lens hardness. The attractive forces include covalent bonds formed in a gel stage of the polymerization of the lens polymer. While covalent bonds have the desirable features of hardening a lens and of imposing scratch resistance on the lens, covalent bonds have an undesirable feature of shrinking the lens as it cools. The shrinkage of the lens polymer sets up internal stresses that can cause hazing.

A third cause of hazing includes inducing a curve into a light polarizing film. A consequence of improperly inducing the curve includes introducing stresses and cracks into the film. The Ceppi U.S. Pat. No. 3,560,076, issued on Feb. 2, 1971, describes constructing the light polarizing film so that the light polarizing film is thicker on a convex side than on a concave side.

The Schuler U.S. Pat. No. 3,711,417, issued on Jan. 16, 1973, describes the use of a particular type of monomer to reduce the possibility of lens hazing. The monomer described has the following general formula:

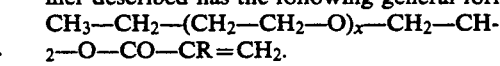
$CH_3-CH_2-(CH_2-CH_2-O)_x-CH_2-CH_2-O-CO-CR=CH_2$.

SUMMARY OF THE INVENTION

The present invention includes a high quality light polarizing spectacle lens capable of having a uniform minimum thickness of about 2.0 millimeters over the cross-section of the lens. The spectacle lens further includes a reserve thickness of about 0.30 millimeters between a light polarizing film element and one of either a rear surface or a front surface of the finished lens. The light polarizing lens of the present invention is resistant to hazing, delamination and discoloration. The lens of the present invention includes smooth surfaces, free from front cylinders, both before and after surfacing the lens.

The present invention also includes a process for making the light polarizing spectacle lens. The process of the present invention includes drying the light polarizing film within a temperature range of approximately 140° F. to 160° F. for approximately 2-12 hours in order to drive any transport media from the polarizing film. The film is then tested for delamination to determine the adequacy of drying. If the delamination test shows that drying is inadequate, the polarizing film is either subjected to additional drying or is rejected. If the delamination test shows that drying is adequate, the film is processed to make the light polarizing lens.

The next step includes cutting flat wafers from the sheet of polarizing film and curving each flat wafer to form a concave wafer surface and an opposing convex wafer surface. The wafer is curved with exacting precision to insure that a concave surface of a front mold element and the concave wafer surface are separated by not more than approximately 1.5 millimeters.

Once wafers are curved, the wafers are again tested for delamination. If any wafer fails the delamination test, the wafer is rejected. The curved wafers passing the delamination test are edged to a precise diameter, notched to align with a pair of protrusions of the gasket of the present invention and installed in the lens mold assembly.

A lens resin is then added to the lens mold assembly that includes the wafer. The lens resin includes a pregelled monomer in a weight percent of 60-75%. The lens is then cured by application of heat according to a temperature profile of the present invention.

The present invention additionally includes a gasket used to position one element of the light polarizing spectacle lens, a light polarizing film, within a lens mold assembly. The gasket positions the polarizing wafer within the lens mold in a manner to preserve the polarizing effect of the wafer, to minimize any distortion of the wafer, and to make a thin light polarizing lens. The gasket includes an annular groove for positioning the wafer within the lens mold in conformance with the predetermined distances.

BRIEF DESCRIPTION OF THE DRAWINGS

FIG. 1 is a side view of a light polarizing spectacle lens of the present invention.

FIG. 2 is a cross-sectional view of a light polarizing film.

FIG. 3 is a top plan view of a notched embodiment of a light polarizing wafer of the present invention.

DETAILED DESCRIPTION OF THE PREFERRED EMBODIMENTS

Figure 4:
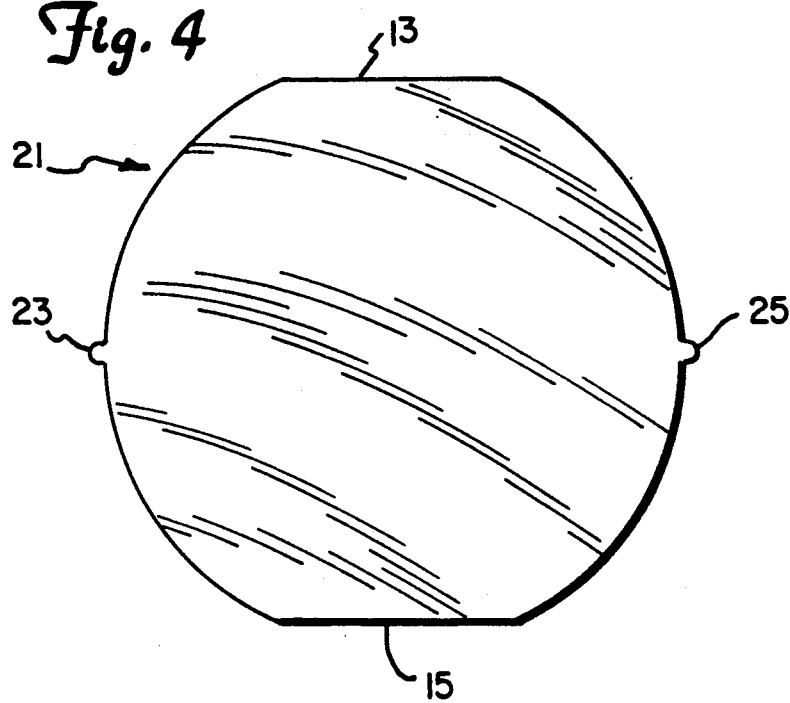
FIG. 4 is a top plan view of a tabbed embodiment of the light polarizing wafer of the present invention.

The present invention includes a high quality light polarizing lens for use in spectacles and a process for making the lens. The process for making the high quality light polarizing lens includes the steps of pretreating and precisely shaping a polarizing film and pregelling a lens resin in which the polarizing film is embedded. The pretreated and precisely shaped polarizing film and pregelled resin are brought together in a lens mold so that the polarizing film is embedded in the pregelled resin. The polarizing film is precisely positioned in the lens mold by a gasket of the present invention.

The light polarizing lens for spectacles incable of having a minimum thickness of about 2.0 millimeters for the entire cross-section of the lens. The light polarizing lens, illustrated at 10 in FIG. 1, includes a rear concave surface 12 and a front convex surface 14. The light polarizing lens 10 includes a light polarizing wafer 20 that is embedded in a hardened, cured lens resin. The light polarizing wafer 20 includes a rear concave surface 16 facing the lens rear concave surface 12 and a front convex surface 52 facing the lens front convex surface 14.

The light polarizing lens 10 includes a reserve thickness 18 between the convex wafer surface 52 and rear convex lens surface 14 of approximately 0.20 to 0.30 millimeters. The light polarizing lens 10 also includes a control distance 50 between the concave wafer surface 16 and the front lens convex surface 14 ranging from 1.45 to 1.70 millimeters.

The polarizing spectacle lens is resistant to hazing. The lens does not noticeably discolor during polymerization of the lens resin. The lens of the present invention does not delaminate. The lens includes a smooth convex surface, free of a front surface cylinder before and after mechanically surfacing the lens. The light polarizing lens is acceptably a single vision lens, a bifocal, trifocal, double segmented lens, blended segmented lens or a progressive lens.

The step of pretreating the polarizing film in the process of the present invention includes selecting a sheet of polarizing film and drying the sheet in order to drive out or otherwise inactivate water, plastisizers and other liquid contaminants within the film. The sheet of polarizing film is typically rolled and has a thickness of approximately 0.686 millimeters. It is not, however, necessary to the process of the present invention that the sheet of polarizing film be either rolled or have a thickness of approximately 0.686 millimeters.

In the most preferred film embodiment illustrated at 19 in FIG. 2, the polarizing film includes two outside layers of cellulose acetate butyrate 22 and 24 and a layer of polyvinyl alcohol 26 sandwiched between the two outside layers of cellulose acetate butyrate. The polyvinyl alcohol layer 26 of the polarizing film 19 is the light polarizing layer of the polarizing film. The polyvinyl alcohol layer 26 is suitably dyed. In one instance, the polyvinyl alcohol 26 is dyed with an aqueous iodine-containing dye. It is believed that the iodine component of the dye forms a linear iodine polymer in the presence of water. When the iodine component of the dye contacts the polyvinyl alcohol, it is believed that iodine polymers are aligned parallel to polymers of polyvinyl alcohol. As a result, the dyed polyvinyl layer is strongly dichroic. The dichroic feature of the polyvinyl alcohol layer confers an axis of polarization on the layer. To further order the dye polymer and polyvinyl alcohol polymer, the polyvinyl alcohol layer is stretched in a direction parallel to the dye and polyvinyl alcohol polymers. The direction of stretch is called the machine direction.

The cellulose acetate butyrate layers 22 and 24 support the polyvinyl alcohol layer 26 and are most preferably of an optical quality. The cellulose acetate butyrate layers 22 and 24 are also dyed in one embodiment of the present invention.

The polarizing film is most preferably dried in a forced air oven. The forced air oven preferably maintains a drying temperature within the range of approximately 140° F. to approximately 160° F. for approximately 2-12 hours. The light polarizing film is dried in order to drive out liquids that function as transport media for catalysts and free radicals migrating from a lens resin to the light polarizing film. The migration of catalysts and free radicals to the light polarizing film contributes to inadequate color uniformity from lens-to-lens and to delamination of a polarizing spectacle lens. Thus, it is believed that drying the polarizing film prevents the movement of materials that can subsequently discolor and delaminate the light polarizing film. Delamination includes the separation of the cellulose acetate butyrate layer from the polyvinyl alcohol layer. Delamination also includes separation of the cellulose acetate butyrate layer from a lens resin layer.

The next step includes testing the polarizing film which has been dried for delamination. Any conventional test method for determining delamination is suitable for use in the process of the present invention. One preferred test for delamination includes removing a sample from the polarizing film and cutting the sample. In one embodiment, the sample was cut in a shape of a wafer having a diameter of approximately 89 millimeters. The sample was scored with a sharp knife, along a 45° or a 135° angle offset from the machine direction. The wafer-shaped sample was then folded over along the scored angle offset until the sample broke. No delamination must occur along the break line for the polarizing film to be suitable for use in the spectacle lens of the present invention. If delamination does occur along the break line, the sheet of polarizing film is either discarded for use or is returned to the drying oven. If the sheet is returned to the drying oven, the total cumulative drying time must not exceed more than approximately 12 hours. If the film is dried for a second time, the polarizing film is retested for delamination.

Once the polarizing film is dried, tested for delamination, and accepted, a plurality of wafers are cut to shape from the film. The wafers are cut using any appropriate device including a guillotine or a punch. In one embodiment, wafers were cut in pairs from a sheet of polarizing film having a width of 96.52 millimeters.

Cutting the polarizing film to make film wafers is one step in a group of steps shaping the polarizing film and positioning the film in the lens mold. The group of steps includes curving the wafer once the wafer has been cut from the sheet material, edging the curved wafer, notching the wafer and aligning the wafer in the gasket so that the notches of the wafer conform to a pair of protrusions on the gasket, and positioning the curved wafer in the lens mold.

The wafer is curved to form the convex wafer surface 52 and the concave wafer surface 16, illustrated in FIG. 1. The wafer is curved so that the curvature of the convex wafer surface 52 is substantially the same as the curvature of the front convex surface 14 of the lens 10. The wafer curvature is measured in diopters.

Preferably, the wafer is curved by a vacuum method. With the vacuum method, the wafer is placed on a curving dish having both a smooth surface that contacts the wafer and a surface opposing the smooth surface. The smooth surface may be either a concave or convex surface. The curving dish is made from a heat conductive material such as stainless steel, aluminum or copper. In one embodiment, the curving dish is heated by a hot fluid that circulates through a coil attached to the opposing surface. The curving dish also includes a small central hole that is connected to a pumping device. The pumping device creates a suction that draws the wafer flat against the curving dish.

The wafer is curved at a temperature and over a time interval that varies with the lens curvature desired. Examples of temperature and time conditions for curving the wafer to a particular base diopter are presented in Table 1. In addition to the vacuum method of curving the wafer, the wafer is also suitably curved under high frequency radiation, by heat radiation or another conventional method.

TABLE 1

| Base Diopters | Temperature °Centigrade (°F.) | Average Time, Seconds |
| --- | --- | --- |
| 2 | 98(208.4) | 100 |
| 4 | 98(208.4) | 200 |
| 5 | 113(235.4) | 900 |
| 6 | 113(235.4) | 1020 |
| 7 | 113(235.4) | 1080 |
| 8 | 113(235.4) | 1200 |

Temperatures in °Fahrenheit were derived from temperatures in °Centigrade.

The wafer is curved with exacting precision in the most preferred embodiment so that the distance between the front convex surface 14 of the lens 10 and the concave surface 16 of the wafer does not exceed about 1.50 millimeters. Table 2 describes ranges of wafer curves and corresponding lens mold curves for single vision, bifocal, and progressive lenses that will produce the most preferred lens of the present invention with the indicated mold curves.

TABLE 2

| Lens Type | Mold Curve Diopters | Addition Diopters | Wafer Min Diopters | Wafer Max Diopters |
| --- | --- | --- | --- | --- |
| Single Vision | 2.00 | | 2.00 | 2.37 |
| | 4.08 | | 4.08 | 4.43 |
| | 6.20 | | 6.34 | 6.65 |
| | 8.32 | | 8.20 | 8.57 |
| Bifocal 28 | 2.00 | all | 2.00 | 2.37 |
| | 4.08 | all | 4.08 | 4.43 |
| | 6.20 | all | 6.34 | 6.65 |
| | 8.32 | all | 8.20 | 8.57 |
| Progressives | 2.54 | all | 2.53 | 2.70 |
| | 5.16 | all | 5.10 | 5.28 |
| | 7.26 | all | 7.30 | 7.46 |
| | 8.32 | all | 8.00 | 8.38 |

In general, the relation between the mold curves and the associated wafer curves is expressed by their sags: Minimum Wafer Sag=Mold Sag−(1.8 −Wafer Thickness−Gasket Space). The gasket space is indicated at 86 in FIG. 6. Maximum Wafer Sag=Mold Sag−(0.3−Gasket Sag). All values are expressed in millimeters.

Once the wafer is curved, a curved wafer sample is again tested for delamination. A suitable delamination test preferably includes the test previously described that is applied to the sheet of light polarizing film or another conventional delamination test. The lots from which the sample wafers are made what do not pass the delamination test are rejected.

In edging one embodiment of the wafer, a wafer is trimmed to a diameter of 82.9 millimeters plus or minus 0.10 millimeters for all lens curvatures. The narrow range of diameter for the edged wafer aids in accurately positioning the wafer within the lens mold.

The edged wafers are notched, as illustrated at 28 and 29 in FIG. 3, to align with gasket protrusions and thus to assure proper orientation of the wafer within the lens. The notches 28 and 29 are separated from each other by 180°. The notches 28 and 29 extend inwardly from the wafer edge, preferably in a u- or a v-shape. The notches 28 and 29 are preferably in alignment with the axis of polarization of the polyvinyl film layer of the wafer 20.

The wafer also includes straight edges 13 and 15. The straight edges 13 and 15 alternate with the notches 28 and 29 around the circumference of the wafer 20. The straight edges substantially oppose each other. The straight edges 13 and 15 permit lens resin to flow around the wafer upon resin filling when the wafer is installed in a lens mold assembly.

One other acceptable embodiment of edged wafers is illustrated at 21 in FIG. 4. The wafer 21 illustrated in FIG. 4 includes tabs 23 and 25. Similarly to the notches 28 and 29 of the preferred cut wafer 20, the tabs 23 and 25 of the acceptably cut wafer 21 orient the 0° to 180° direction of the light polarizing wafer. The straight edges 13 and 15 are positioned in about the same location for either the notched 20 or tabbed 21 wafer embodiments.

Figure 5:
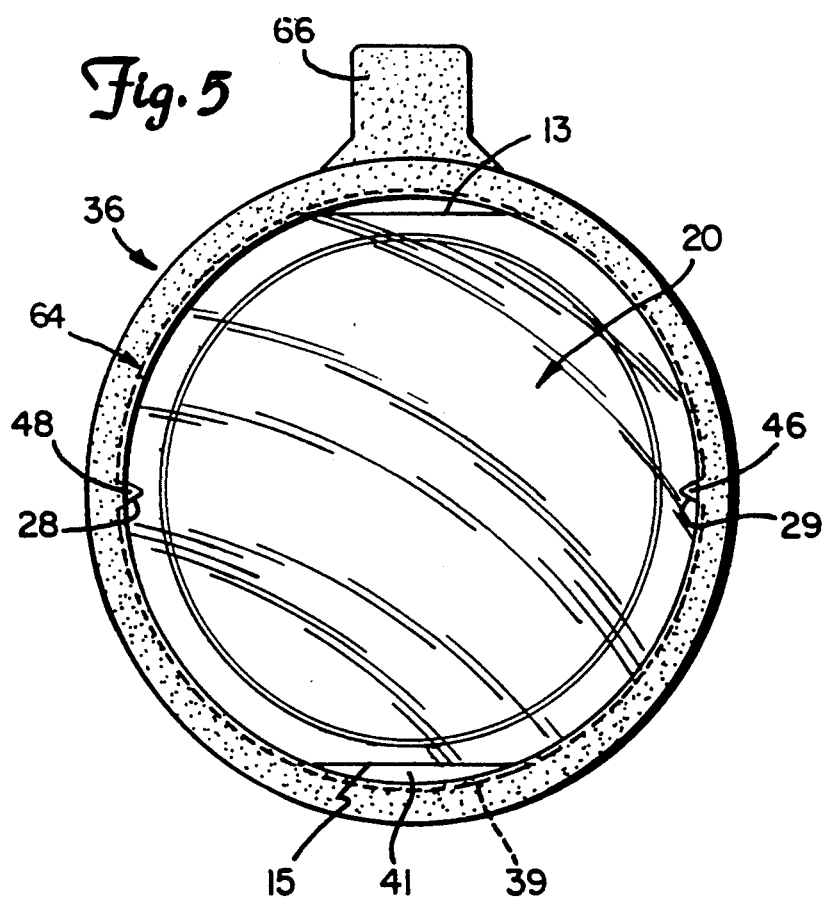
FIG. 5 is a top plan view of the gasket of the present invention.
Figure 6:
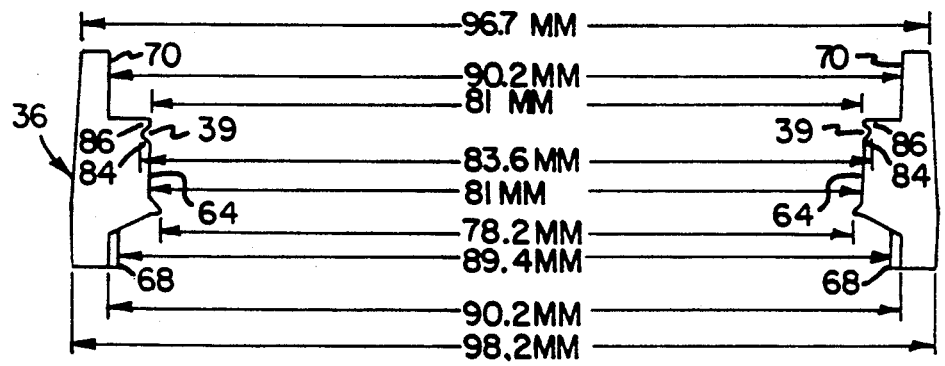
FIG. 6 is a cross-sectional view of an inner portion of the gasket of the present invention.

The notched polarizing wafer 20 is positioned in the gasket 36 of the present invention, illustrated in FIG. 5. The gasket 36 includes a central annular flange portion 64 that defines generally the diameter and thickness of the lens to be produced. The central annular flange portion 64 includes an annular groove 39 in which the polarizing wafer 20 is positioned. The annular groove 39 is bordered by a pair of walls 84 and 86 that are each angled at about 15°, as illustrated in FIG. 6. At its deepest point, the annular groove 39 has a diameter of about 83.6 mm. The wall angles permit the annular groove 39 to hold the wafer 20 in the mold assembly as illustrated in FIG. 5. The gasket 36 also includes a front annular flange portion 70 that positions a front element of the lens mold assembly and a rear annular flange portion 68 that positions a rear element of the lens mold assembly as illustrated in FIG. 6.

The gasket 36 further includes a pair of opposing protrusions 46 and 48 for aligning the notches 8 and 29 of the wafer 20. The alignment of the protrusions and notches insures that the axis of polarization will be positioned substantially the same for all light polarizing spectacles lenses. In another embodiment, the gasket 36 includes a pair of opposing notches (not shown) for aligning tabs 23 and 25 of the wafer 21.

The positioning of the wafer notch 28 or 29 or the tab 23 or 25 relative to the gasket protrusions 46 and 48 must be within approximately 6° of the gasket protrusions. This range provides that glare cutting capacity of the spectacle lens is achieved to an accuracy of 2% within prescription laboratory alignment tolerances. The gasket 36 additionally includes an outer tab 66 used to pry the mold assembly open for filling with resin.

The present invention includes gaskets having different dimensions for different lens curvatures. The dimensions of the gaskets, combined with the wafer curvatures indicated in Table 2, assure the proper location of the wafer 20 relative to the front and rear mold elements. Most preferably, a lens curvature is selected. A front mold curve is selected that will produce the selected lens curvature. A polarizing wafer curvature and diameter can then be determined to insure that the wafer will be in close proximity to the front mold element.

Figure 7:
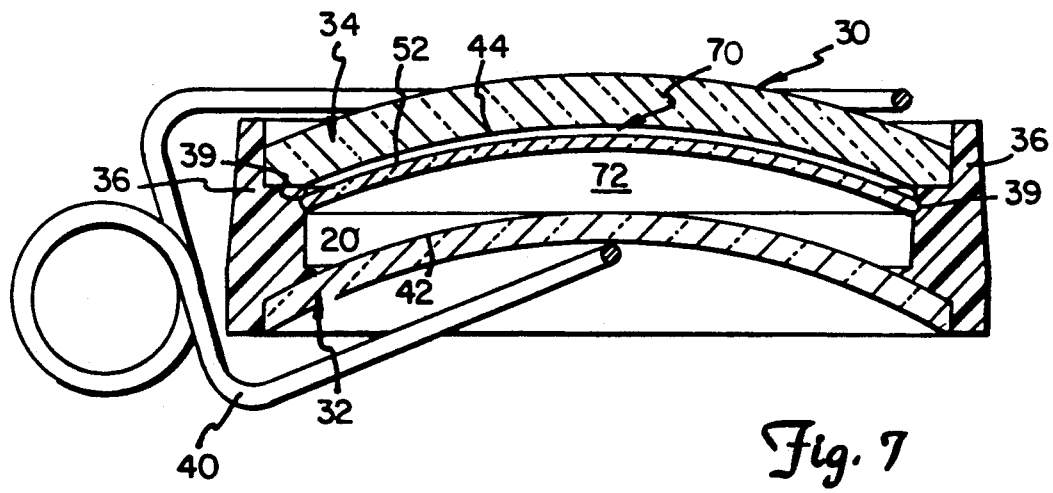
FIG. 7 is a side view of a lens mold assembly of the present invention.

The film polarizing wafer 20 is positioned within the annular gasket groove 39 in a manner to leave a space 41 under the wafer 20 as illustrated in FIG. 7. The space 41 permits a liquid monomer form of the lens resin to flow under the wafer 20 and permits air bubbles to be released from beneath the wafer 20 when the lens resin is added to the mold assembly.

The polarizing wafer 20 is positioned within the lens mold assembly in conformance with the preferred type of lens mold assembly used for making the light polarizing spectacle lens is illustrated at 30 in FIG. 7. The lens mold assembly 30 includes a front glass element 34 and a rear glass element 32. The gasket 36 spaces the two glass elements 32 and 34 apart to a distance imparting a desired thickness to the spectacle lens. The elements 32 and 34 are held together by a clamp 40.

The rear glass element 32 includes a smooth surface 42 against which a lens polymer is contacted. The element 32 imparts a smooth, concave surface to the spectacle lens. The front glass element 34 also includes a smooth concave surface 44 that contacts the lens resin. The front element 34 imparts a smooth, convex surface to the spectacle lens.

In the preferred lens mold assembly 30, illustrated in FIG. 7, the front convex surface 52 of the wafer 20 is spaced from the smooth concave surface of the front element 34 by about 0.20 to 0.30 millimeters, with a maximum of 0.80 millimeters. The positioning insures that the spectacle lens can be made to a minimum thickness of 2.0 millimeters over the cross section of the lens. The positioning also insures that the lens includes a reserve thickness at the concave back surface of the finished lens of approximately 0.20 to 0.30 millimeters.

The polarizing effect of the wafer can be decreased if the wafer is positioned too far from the front surface of the spectacle lens. The decrease in polarizing effect is a particular problem when the lens resin, diethyleneglycol-bis-(allyl carbonate), $C_{12}H_{18}O_7$, or allyl diglyool carbonate (CR-39 ®, manufactured by PPG Industries of Bessemer City, NC, or Nouryset HV 250 ®, manufactured by AKZO Chemie America of Burt, NY) is used. The CR-39 ® becomes birefringent under stress. If too great a thickness of lens resin is in front of the light polarizing wafer, the light will get polarized in different directions, including a radial direction. The extent of polarization depends upon the thickness of the CR-39 ® lens resin and the stress to which the lens resin is subjected. Thus, the light that was linearly polarized in a direction perpendicular to the pass-direction of the polarizing wafer can now be polarized parallel to that direction and passed by the wafer. Hence, no light extinction will take place.

Once the curved polarizing wafer 20 has been properly positioned within the lens mold assembly 30 by insertion in the gasket groove 39, the lens mold assembly 30 is filled with a lens resin so that the lens resin surrounds and embeds the polarizing wafer. Specifically, the lens resin passes through the space 41 between the wafer 20 and the central annular flange portion 64 of the gasket 36.

Preferably, the CR-39 ® resin is partially pregelled as a monomer to prevent hazing and orange peel. Pregelling the monomer is also believed to aid in properly curving the front surface of the final lens product. The resin is most preferably prepared from a pregelled monomer and a conventional monomer of diethyleneglycol-bis-(allyl carbonate) in one of the ratio examples indicated in Table 3.

TABLE 3

| Examples | Pregel Monomer Weight % | Conventional Monomer Weight % | IPP Weight % |
|---|---|---|---|
| 1 | 70 | 30 | 2.80 |
| 2 | 65 | 35 | 2.90 |
| 3 | 75 | 25 | 2.70 |

Most preferably, the resin viscosity was maintained within a range of about 100 and 120 centipoise at 69.8° F. The resin temperature was maintained at about 55.4° F. for no longer than six hours. The resin was most preferably mixed in a dry environment to prevent water condensation from getting into the mixture.

The resin is pregelled by any conventional method used in lens casting. In one preferred embodiment, a quantity of CR-39 ® was mixed with isopropyl percarbonate (IPP) to form a mixture having an IPP concentration of 0.1 % by weight of the mixture. The CR-39 ® and IPP were added to a non-corrosive mixing vessel, leaving ample room at the top of the vessel for mixing. The components were mixed at a speed fast enough to thoroughly mix the components without creating bubbles.

The mixture was slowly heated to a temperature not exceeding 120° F. concurrently with being mixed. The viscosity of the mixture was continuously sampled until the viscosity no longer changed. The mixture was then cooled to a temperature range of 65° F. to 70° F. Once the temperature of the mixture fell within the 65° F. to 70° F. range, a quantity of CR-39 ® was added to the mixture, to achieve a mixture viscosity of about 110 centipoise.

When the mixture achieved a viscosity of about 110 centipoise, acrylic acid, methyl methacrylate (MMA), a u.v. absorber, and IPP were added to the mixture in the weight percent concentrations indicated in Table 4. The mixture was then mixed for at least 45 minutes at a temperature of 65° F. to 70° F. The use of acrylic acid and methyl methacrylate (MMA) is not mandatory and can also be omitted.

TABLE 4

| Component | Wt. % |
|---|---|
| Acrylic acid | 1.4 |
| MMA | 5.0 |
| u.v. Absorber | 0.03 |
| IPP | 2.8 |

The mixture was ready for use in the process of the present invention with a precaution. The precaution was that the gel have a viscosity permitting flow into cavities of the lens mold. The cavities include a cavity bordered by the polarizing wafer 20 and the front concave element 34 of the lens mold 30, the convex cavity, illustrated at 70 in FIG. 7. The cavities also include a concave cavity, illustrated at 72 in FIG. 7. The convex cavity 70 typically fills with gel more slowly than the concave cavity 72.

Once the concave cavity 72 fills with gel and the convex cavity 70 is partially filled with gel, the step of filling the lens mold 30 is stopped until the two cavities reach the same level. When the gel levels in the two cavities is the same, the cavities are topped off with gel.

When filling the lens mold 30 with gel, straight edges of the wafer 20, illustrated at 13 and 15 in FIG. 2, are most preferably in a vertical plane. Most desirably, the lens mold is topped off within 5 minutes of filing in order to prevent formation of a level line.

Once the step of filling the lens mold with gelled resin is completed, the spectacle lens in the mold is cured. The lens is preferably cured in a curing bath within 30 minutes of filling the lens mold with the pregelled monomer. The lens is acceptably cured in a curing oven within 30 minutes of filling the lens mold with pregelled monomer. For both the bath and the oven, the starting temperature of the curing cycle is approximately 105° F.

The curing step of the light polarizing lens is most preferably performed in two stages. In a first stage of the most preferred embodiment, the lens is heated according to the time and temperature profile described in Table 5. In the first stage of other alternative suitable embodiments, the light polarizing lens is heated according to time and temperature profiles described in Table 6.

TABLE 5

| PREFERRED TEMPERATURE PROFILE | |
|---|---|
| Hour # | End Temperature °Fahrenheit |
| 0 | 107.6 |
| 2 | 127.4 |
| 4 | 136.4 |
| 14 | 170.6 |
| 22 | 131.0 |

TABLE 6

| | ALTERNATE TEMPERATURE PROFILES | | |
|---|---|---|---|
| Hour No. | Alternate #1 End Temperature °Centigrade (°F.) | Alternate #2 End Temperature °Centigrade (°F.) | Alternate #3 End Temperature °Centigrade (°F.) |
| 0 | 50 (122) | 50 (122) | 42 (107.6) |
| 1.5 | 50 (122) | 50 (122) | 52 (125.6) |
| 3.5 | 53 (127.4) | 53 (127.4) | 56 (132.8) |
| 5.5 | 57 (134.6) | 57 (134.6) | 60 (140) |
| 12 | 77 (170.6) | 77 (170.6) | 77 (170.6) |
| 22 | 55 (131 End) | 55 (131) | 55 (131) |
| 72 | | 55 (131 End) | 55 (131 End) |

Temperatures in °Centigrade were derived from temperatures in °Fahrenheit.

The second stage of the curing step is a post cure stage. In the post cure stage, the light polarizing lens is subjected to a temperature of approximately 200° F. for approximately 6 hours after the spectacle lens has been removed from the lens mold. The post cure heating step of the process of the present invention produces a lens that has no front surface cylinder either before or after surfacing.

Upon completion of the cure stage, the lens mold clamp 40 is released, the mold is opened and the light polarizing lens is removed from the lens mold. Once removed, the lens is preferably treated with an abrasion resistant coating. The abrasion resistant coating is acceptably applied to the lens by one of several conventional techniques that include organic coating by spin, flow, spray or dip coating, vacuum coating, chemical vapor deposition coating, or chemical coating. Organic abrasion coating can also be applied by coating the mold at the cavity side of the mold assembly, before filling the mold with resin.

The process of the present invention is an improvement over other processes in that delamination of the lens is greatly reduced. Also, the process of the present invention strikes a fine balance between the timing of lens resin polymerization, timing and amount of resin catalyst, and timing of the curing cycle in order to produce a high quality, non-delaminating lens. The process of the present invention is an improvement over other processes in that color consistency within each lens and from lens to lens is achieved to a superior degree not obtained by processes conventionally in use.

Although the present invention has been described with reference to preferred embodiments, workers skilled in the art will recognize that changes be made in form and detail without departing from the spirit and scope of the invention.

What is claimed is:

1. A process for making a light polarizing spectacle lens using a lens mold, comprising:
   drying a polarizing film at a temperature and a time effective to drive any transport media from the polarizing film;
   testing the dried polarizing film for delamination;
   accepting the polarizing film if the film does not delaminate in the test after drying;
   shaping the dried polarizing film into a wafer having a pair of opposing straight edges after accepting the dried polarizing film;
   curving the polarizing film wafer after shaping the dried polarizing film with the proviso that when the plarizing film wafer is curved to a diopter listed below, the wafer is curved substantially at a temperature in degrees Fahrenheit for a time substantially indicated as follows;

| Diopter | Temperature °F. | Time |
| --- | --- | --- |
| 2 | 208.4° F. | 100 seconds |
| 4 | 208.4° F. | 200 seconds |
| 5 | 235.4° F. | 900 seconds |
| 6 | 235.4° F. | 1020 seconds |
| 7 | 235.4° F. | 1080 seconds |
| 8 | 235.4° F. | 1200 seconds | and
   when the polarizing film wafer is positioned in a lens having a front element concave surface curve having substantially the following curvature in diopters, that the wafer is curved to a curvature substantially within one of the following ranges of diopters;

| Curvature Range | Diopters |
| --- | --- |
| 2.00–2.37 | 2.00 |
| 4.08–4.43 | 4.08 |
| 6.34–6.65 | 6.20 |
| 8.20–8.57 | 8.32 | and
   when the polarized film wafer is positioned in a progressive lens substantially having one of the curvatures listed below, the wafer is curved to a curvature substantially within one of the following ranges;

| Curvature Range | Diopters |
| --- | --- |
| 2.53–2.70 | 2.54 |
| 5.10–5.28 | 5.16 |
| 7.30–7.46 | 7.26 |
| 8.00–8.38 | 8.32 | positioning the wafer within the lens mold;
   filling the lens mold with a lens resin mixture comprising a pregelled monomer with a weight percent of about 65-75% of the mixture, a conventional monomer of about 25-35% by weight of the mixture and IPP of about 2.70-2.90% by weight of the mixture; permitting the resin to cure; and
   drying the polarizing film within an approximate range of 140° F. to 160° F. for about 2 to 12 hours.

2. The process of claim 1 and further comprising
   notching the polarizing wafer to form two notches separated by 180° before positioning the wafer in the lens mold to orient the wafer once the wafer is positioned within the lens mold;
   positioning the wafer in the lens mold by fitting the wafer in an annular groove of a gasket having a pair of protrusions positioned about 180° apart and wherein the notches of the wafers are aligned within 6° of the gasket protrusions;
   making the pregelled monomer by a method comprising;
      mixing a quantity of allyl glycol carbonate and isopropyl percarbonate (IPP) to form a mixture having an IPP concentration of about 0.1% by weight of the mixture;
      heating the mixture to a temperature of not more than 120° F. in order to form the pregelled monomer;
      sampling and testing the pregelled monomer for viscosity; and
      cooling the pregelled monomer to a temperature range of about 65° F. to 70° F., wherein the monomer has a viscosity of about 110 cps for at least 45 minutes prior to adding the lens resin to the lens mold; and
   curing the lens by a time of heating lens temperature profile substantially comprising;

| 0 hrs | 107.6° F. |
| --- | --- |
| 2 | 127.4 |
| 4 | 136.4 |
| 14 | 170.6 |
| 22 | 131.0. |

3. The process of claim 1 and further including removing the lens from the lens mold following curing of the lens and post curing the light polarizing lens by heating the lens to 200° F. for about 6 hours.

* * * * *

UNITED STATES PATENT AND TRADEMARK OFFICE
CERTIFICATE OF CORRECTION

PATENT NO. : 5,286,419

DATED : February 15, 1994

INVENTOR(S) : Raoul F. van Ligten; Mark G. Asmus

It is certified that error appears in the above-identified patent and that said Letters Patent is hereby corrected as shown below:

Col. 12, line 46, delete "time of heating lens temperature", insert --time of heating-lens temperature--

Signed and Sealed this

Twelfth Day of July, 1994

*Attest:*

BRUCE LEHMAN

*Attesting Officer*   Commissioner of Patents and Trademarks